United States Patent [19]

de Graaf et al.

[11] Patent Number: 5,060,419

[45] Date of Patent: Oct. 29, 1991

[54] SUBSTRATE FOR OUT-OF-GROUND CULTIVATION

[75] Inventors: Martien de Graaf, Vijfhuizn, Netherlands; Jacques Vos, Chatou; Dominique Plantard, Paris, both of France

[73] Assignee: Isover Saint-Gobain, Courbevoie, France

[21] Appl. No.: 496,933

[22] Filed: Mar. 21, 1990

[30] Foreign Application Priority Data

Mar. 21, 1989 [FR] France ............................. 89 03651

[51] Int. Cl.⁵ ............................................. A01G 9/02
[52] U.S. Cl. ............................................. 47/64; 47/81
[58] Field of Search ................... 47/64, 81, 60, 61, 62, 47/63

[56] References Cited

U.S. PATENT DOCUMENTS 4,058,931  11/1977  Vestergaard ........................... 47/64

FOREIGN PATENT DOCUMENTS 62-220128  9/1987  Japan ........................................ 47/81

*Primary Examiner*—Richard E. Chilcot, Jr.
*Assistant Examiner*—Joanne C. Downs
*Attorney, Agent, or Firm*—Oblon, Spivak, McClelland, Maier & Neustadt

[57] ABSTRACT

A substrate of limited dimensions consisting of mineral fibers for out-of-ground cultivation is used for the cultivation phase corresponding to the development of seedlings. This substrate, of general parallelepipedic shape, exhibits small surface protuberances on its lower face which separate it from the ground on which it rests. The protuberances can be feet disposed on the lower face of the substrate, or edges formed by providing the substrate with a concave lower face. The substrate according to the invention makes it possible to improve out-of-ground cultivation conditions.

12 Claims, 1 Drawing Sheet

FIG_1
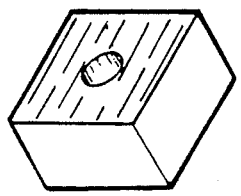
FIG_2A  FIG_2B  FIG_3A  FIG_3B
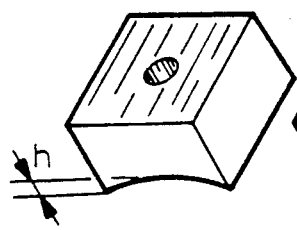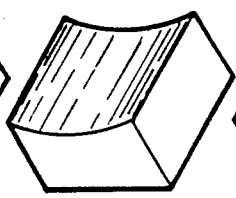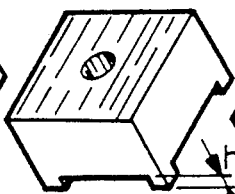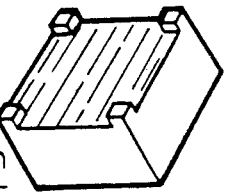
FIG_4A  FIG_4B          FIG_5
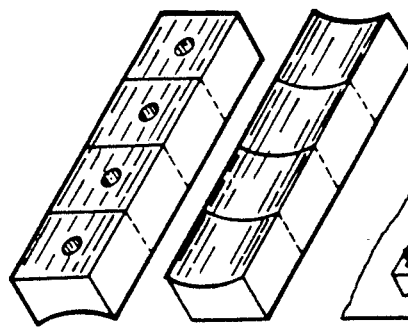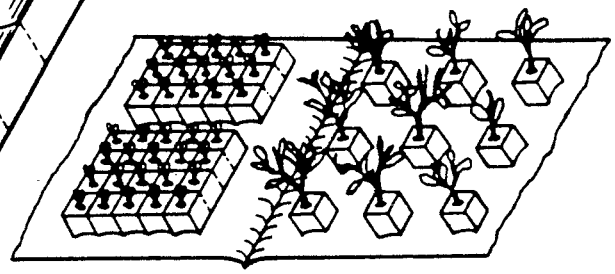
FIG_6
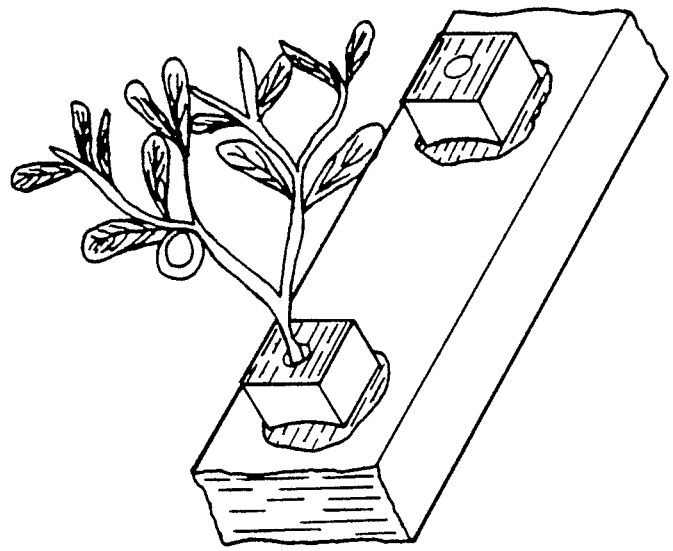

SUBSTRATE FOR OUT-OF-GROUND CULTIVATION

BACKGROUND OF THE INVENTION

1. Field of the Invention

The invention relates to substrates used in out-of-ground cultivation techniques. More precisely, the invention relates to substrates used in cultivation techniques that employ successive stages of growth of the seedlings, with each stage leading to the use of a substrate offering a volume greater than that of the preceding one to make possible a satisfactory development of the rooting system of the seedling.

The invention also relates to mineral substrates on which the seedlings are developed calling for only a limited volume on the order of magnitude of 1 liter. More precisely, the invention relates to substrates of such mineral fibers as those consisting of glass wool or mineral wool.

2. Discussion of the Background

In intensive methods of out-of-ground cultivation, good management of materials and of available space leads to a sequence of stages corresponding to the use of specific substrates. The most widely used method at present in out-of-ground cultivation in the greenhouse comprises at least two successive stages. The first stage corresponds to the initial growth of the seedlings. As the seedlings are not very large and exhibit limited development of the rooting system, a substrate of restricted volume is preferred at this stage. This makes it possible to increase the number of seedlings cultivated in a limited space. This also makes it possible to minimize the volume of nutritive solution necessary to maintain the substrate under suitable conditions for the development of seedlings.

In the second stage, the seedlings which have grown tall on these limited volume substrates are placed, along with the first substrate, on a second substrate offering a larger volume, and ordinarily spaced from one another.

In the methods of intensive cultivation which represent the most significant prospects for this type of product substrates are used having a cubic shape and will hereinafter be referred to as "cubes". The cubes are placed against one another, in a first step, on a wide surface. In this type of arrangement, it is necessary to provide both satisfactory irrigation and suitable aeration to assure the most complete and the quickest growth of the seedlings. The irrigation can be performed either from the upper part of the cubes, or from their base, i.e. the part resting on the ground. In practice, the two irrigation methods can be combined.

Often, the cubes are placed in a unit which forms a sort of tank capable of receiving enough irrigation solution to partially submerge the cubes. The solution rises to a sufficient level relative to the height of the cubes so that the cubes are completely saturated. For cubes of ten centimeters or so in height, the temporary level of the irrigation solution reaches, for example, a third of the height of the cube. The solution then rises in the substrate by capillary action. With this irrigation performed, the irrigation solution is drained and recovered for a later operation. This type of irrigation operation is repeated at a frequency depending both on the cultivation being considered and the ambient conditions, season, temperature, evaporation, etc.

After a certain development of the seedlings, it is normal to separate the cubes from one another to offer more space and light. At this stage also the irrigation is advantageously performed as indicated above, a method that is designated by the term "subirrigation."

In these two stages of cultivation in cubes, it was pointed out that it was necessary to assure good aeration of the roots between the successive irrigations. This aeration is a necessary condition to good development of the roots. The traditional cubes used exhibit a level base resting completely on the ground or, more exactly, on the bottom of a tank or on a covering, most often an impermeable film covering the ground and separating the cubes from the ground. In all these applications, a difficulty arises. The lower face of the cubes tends, in contact with the support on which it rests, to maintain a liquid film after the irrigation has stopped. In other words, when the irrigation solution is evacuated, whether the solution has been introduced by subirrigation or by irrigation through the upper face of the cubes, the contact between the cube and its support maintains, by what can be named a surface effect, a continuous liquid film which is opposed to the normal drainage of the cube under the effect of gravity. Under these conditions, water retention is extended substantially, resulting in the establishment of an unfavorable air/water ratio.

To reestablish a quick drainage of the solution after each irrigation operation, a technique developed by the users has been to place under the cubes a porous material or slatted floors which eliminate this surface effect by breaking the contact between the cubes and their support. These means, however, have the drawback of complicating the maintenance of the cultivation areas. In particular, they must be sterilized between each new cultivation.

Another solution used consisted of making grooves on the lower face of the cubes. These grooves, which are on the order of 1 to 2 centimeters in depth and width, divide the film in a way which improves the drainage and, as a result, the aeration of the cubes. These grooves make possible the reduction of the surface of contact by about one third and the return to a suitable air/water balance in an appreciably shortened period after each irrigation. A surface consistently in contact with the support also remains, however, at the base of the cube, and, although very small, the underlying liquid film remains present at these points of contact.

SUMMARY OF THE INVENTION

Accordingly, one object of this invention is to provide a substrate without the aforementioned problems.

Another object of this invention is to improve out-of-ground cultivation by minimizing the effect of a liquid film which can form on the bottom of substrates used in out-of-ground cultivation.

A further object is to provide a substrate having a small ratio of contact area to bottom surface area.

These and other objects of this invention are accomplished by using substrates of general parallelepipedic shape. This shape is that which those skilled in the art will appreciate as the most practical.

To meet the objects of the invention, the substrates exhibit, on their lower face, protuberances on which, in use, the substrates rest. The protuberances are advantageously of the same material as that of which the substrate consists. The surface of contact of these protuberances with the support on which they rest remains less than a tenth of the total surface of the total base of the substrate and, preferably, less than a twentieth.

The shape of the protuberances is chosen principally as a function of convenience taking into consideration the particular embodiment.

The protuberances break up the continuity of the contact of the lower face of the substrate with the support upon which it rests. This results in minimizing the extent of a liquid film formed on the lower face of the substrate during irrigation of the substrates.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a substrate in traditional cube shape according to the prior art,

FIGS. 2a and 2b exhibit an embodiment of a cube according to the invention in top view and bottom view, FIGS. 3a and 3b exhibit another embodiment of a cube according to the invention in top view and bottom view, FIGS. 4a and 4b exhibit rows of cubes in top view and bottom view, FIG. 5 shows, diagrammatically, a method of use of the cubes in the first stages of the cultivation of seedlings, and FIG. 6 shows the use of the cubes on cultivation slabs.

DESCRIPTION OF THE PREFERRED EMBODIMENTS

Referring now to the drawings, wherein like reference numerals designate identical or corresponding parts throughout the several views, and more particularly to FIG. 1, a prior art "cube" 10 which is of traditional shape for the glass wool or mineral wool substrates is shown. Its dimensions, are, for example, a square base of 120×120 mm and a height of 75 mm.

The transport of these substrates, by the ability to closely pack the substrates is improved by minimizing lost volume. Their production also is facilitated greatly and lends itself to advanced automation. These advantages are very appreciable for products which must necessarily be offered at very low prices.

The parallelepipedic shape makes possible the convenient groupings of these elements on a small surface in the stages of the cultivation where it is advantageous to minimize the surface occupied, such as when the seedlings are in the early stages of development.

For the convenience of the disclosure, we will designate below these elements of substrates under the name "cubes," it being understood that they do not necessarily, nor even generally, exhibit a truly cubic shape. This name nevertheless is chosen because it corresponds to that which is ordinarily used by those skilled in the art.

The substrates according to the invention for the cultivation of the seedlings, are of parallelepipedic shape exhibiting, in their use, a surface of contact with the support on which they rest reduced to the necessary minimum required for their stability.

The materials of the cubes, whether they are glass fibers or mineral fibers, are chosen sufficiently "rigid" so that they do not deform appreciably under the effect of their own weight, even when they are saturated with irrigation solution. This is obtained by choosing felts whose density is sufficient on one hand and whose structure reinforces the rigidity.

In particular, the dominant orientation of the fibers can be chosen to improve the resistance to crushing. It also is possible to make these felts more resistant by a more homogeneous tangling of the fibers. The dimensions of the fibers (diameter, length) also can be chosen, to a certain extent, according to the known principles to determine the mechanical characteristics in the separation applications of this type of felt.

Referring again to FIG. 1, the prior art cube, on its upper part, generally includes a cavity 12 to receive either a previously germinated seed on a support whose shape corresponds to that of the cavity, or a seed directly. In the largest farms, it is normal to initiate the germination separately, which saves space and improves the profitability of the installations by reducing the time the available surfaces are occupied.

The cube ordinarily is coated with an impermeable film 14 on its lateral faces. The purpose of this film is to reduce the surface of the substrate exposed to the ambient air in the final stages of the cultivation when the cubes are separated from one another (including when they are placed on the cultivation slabs as we will indicate below in connection with FIG. 6). By reducing the exposure to the ambient air, the evaporation and the drying risks of the substrate and the necessity of joining the successive cubes when supplies of solution are limited.

FIG. 2 shows, in perspective, a cube 20 according to the invention whose base 26 is not level but exhibits a concave cylindrical shape. As indicated above, this configuration exhibits the great advantage of making the cube rest only on two edges 22 and 24 of the base of the cube. The surface of contact then is extremely limited relative to the base surface.

In practice, even if the material is quite rigid, there is, of course, a certain packing down of these edges. Nevertheless, from experience, the width of the strip of contact with the support ordinarily does not exceed 3 to 5 mm on each side. For a cube with a total width on the order of 120 mm, a contact area results which is much less than a tenth of the base surface.

In the embodiment shown in FIG. 2, height h between the vertex of the cylindrical part of the base 26 and the lateral protuberances 22 and 24 is advantageously limited. On one hand, as we have indicated, a great height is not necessary to prevent the formation of a continuous liquid film at the base of the cube. For this purpose, several millimeters between the base of the cube and the support on which they rest is sufficient. On the other hand, it is preferable to limit this height so that, in a final phase of the cultivation, which is performed by placing the cubes on the cultivation slabs as shown in FIG. 6, the continuity of the contact of the substrate with the slabs is suitably assured.

Actually, it is important, when the cube is in position on the slab, that the roots pass from one to the other without a great discontinuity between the cube and slab. If the distance separating the bottom of the cube from the upper surface of the slab becomes too great, the space thus formed will not promote the passage of the roots due to excessive aeration. In practice, since the cubes, like the slabs, consist of a semi-rigid material, applying a slight pressure on the cube, when the height h is not too great, practically makes it possible to bring the two surfaces into contact with one another. To be able to obtain this satisfactory installation, the height h is maintained preferably less than about 12 mm.

If necessary, also to reduce the distance between the cube and the slab, it is possible to provide ribs on the surface of the slab in which the protuberances of the lower face of the cube are housed.

The production of such cubes as shown in FIG. 2 can advantageously be performed from flat-face cubes which are shaped, for example, by a milling machine of corresponding shape.

FIG. 3 shows a cube 30 exhibiting protuberances 34 in the shape of feet placed at the four corners of the lower face of the cube. This time, the lower face 32 is level. As above, the surface of contact with the support is significantly limited so that the drainage of the cubes can be performed rapidly.

The protuberances 34, as above, advantageously consist of the same material as the substrate. The formation of these feet is obtained, for example, by cutting. The same above-mentioned considerations relative to height h are also applicable to the protuberances of this embodiment.

In the two disclosed embodiments according to the invention, obtaining good drainage between each irrigation operation promotes a satisfactory development of the roots. In practice, the roots which preferably tend to reach the base of the cube are stopped in their progression by contact with the air. Lateral root branches then are created which promote a better use of the cube by a more complete colonization of the mass of the cube.

The cubes, for reasons of convenience, ordinarily are marketed in rows 40 formed of several assembled cubes, as shown in FIG. 4. The cubes are generally are joined to one another by lateral adhesive strips (not shown) which later can be either withdrawn or cut to separate the cubes. The adhesive strips, in this case, are applied to the impermeable film 14 which surrounds the lateral faces of the cube.

FIG. 5 shows, in section, a cultivation tank 50 of seedlings. Two successive stages of the cultivation are shown there. In the first stage, shown in the left part, rows of cubes 40 such as those shown in FIG. 4 are placed adjacent to the drain of the irrigation tank 54. In the second stage, shown at right, the cubes are disengaged and separated from one another.

In this second stage of the cultivation, the subirrigation of the traditional cubes can lead to a movement of the cubes. Particularly if the ground is not perfectly horizontal, which is preferred to improve the drainage, the cubes can slide on a liquid film formed on the bottom surface of the cube. The absence of this film according to the invention rules out any risk of movement of the seedlings and therefore the obligation of manually reestablishing a momentarily compromised distribution.

FIG. 6 shows the last stage of the cultivation. The cubes 20 are placed on larger slabs 60. Ordinarily, the slabs are also coated with an impermeable film 64 which limits the losses by evaporation. The impermeable film 64 is provided, on the upper part, with openings 62 corresponding to the locations of the cubes.

As indicated above, it is important to assure a good contact between the cube and the slab. The latter was obtained automatically when the base of the cubes is perfectly level. This contact cannot be complete with the cubes exhibiting grooves.

The use of the cubes according to the invention, either by applying a slight pressure when joining the cube and the slab, or by providing grooves on the slab, assures a satisfactory joining of the two cultivation substrates as long as, in the first case, the height conditions of the protuberances set above have been met.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A substrate for the cultivation of seedlings, comprising:
   a parallelepiped formed of semi-rigid felt having a lower face,
   said lower face of said parallelepiped resting on protuberances separating said lower face from a support on which said parallelepiped rests, and
   a ratio of surface contact of said protuberances to the entire surface of said lower face being very small.

2. A substrate according to claim 1, wherein said lower face has a generally concave cylindrical shape and said protuberances comprise edges of said concave lower face which contact said support.

3. A substrate according to claim 2, wherein said protuberances have a surface of contact sufficiently small with said support whereby said substrate when treated by subirrigation does not maintain a liquid film capable of moving said substrate.

4. A substrate according to claim 1, wherein said protuberances are formed at four corners of said lower face.

5. A substrate according to claim 4, wherein said protuberances have a surface of contact sufficiently small with said support whereby said substrate when treated by subirrigation does not maintain a liquid film capable of moving said substrate.

6. A substrate according to claim 1, wherein said protuberances have a surface of contact sufficiently small with said support whereby said substrate, when treated by subirrigation, does not maintain a liquid film capable of moving said substrate.

7. A substrate according to claim 1, wherein said felt is comprised of mineral fibers.

8. A substrate according to claim 1, wherein said felt is comprised of glass fibers.

9. A substrate according to any one of claims 1–5, wherein said ratio is less than or equal to 0.1.

10. A substrate according to any one of claims 1–5, wherein said protuberances extend not more than 12 mm from the most distant point of said lower face.

11. A substrate according to any one of claims 1–5, wherein said substrate is placed on top of a cultivation slab having grooves and notches in an upper surface upon which said substrate is placed, said grooves and notches receiving said protuberances to form a secure continuous contact between said substrate and said slab.

12. A substrate according to any one of claims 1–5 wherein said substrate is placed on top of a cultivation slab and pressed to have secure continuous contact between said substrate and said slab.

* * * * *